United States Patent
Devor et al.

(10) Patent No.: US 9,830,263 B1
(45) Date of Patent: Nov. 28, 2017

(54) CACHE CONSISTENCY

(71) Applicant: EMC Corporation, Hopkinton, MA (US)

(72) Inventors: Orly Devor, Zichron Yaakov (IL); Lior Zilpa, Bat Yam (IL); Michael Deift, Ramat Gan (IL); Eli Ginot, Tel Aviv (IL); Philip Derbeko, Modiin (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/319,343

(22) Filed: Jun. 30, 2014

(51) Int. Cl.
*G06F 12/00* (2006.01)
*G06F 13/00* (2006.01)
*G06F 13/28* (2006.01)
*G06F 12/0815* (2016.01)
*G06F 3/06* (2006.01)

(52) U.S. Cl.
CPC ........ *G06F 12/0815* (2013.01); *G06F 3/0619* (2013.01); *G06F 3/0665* (2013.01); *G06F 3/0689* (2013.01)

(58) Field of Classification Search
CPC .... G06F 3/0619; G06F 3/0655–3/0667; G06F 3/0683–3/0689; G06F 9/46; G06F 9/52–9/528; G06F 12/084–12/0859; G06F 12/12; H04L 12/2602–12/2694; H04L 43/00; H04L 43/10; H04L 43/103; H04L 43/106
See application file for complete search history.

(56) References Cited

U.S. PATENT DOCUMENTS

| | | | | |
|---|---|---|---|---|
| 7,865,675 B2* | 1/2011 | Paver | ............... | G06F 9/3879 711/135 |
| 8,239,633 B2* | 8/2012 | Wood | ............... | G06F 12/0815 711/141 |
| 8,510,279 B1* | 8/2013 | Natanzon | ............ | G06F 17/30073 707/697 |
| 8,996,820 B2* | 3/2015 | Suzuki | ............... | G06F 12/0815 711/141 |
| 9,043,535 B1* | 5/2015 | Derbeko | ............ | G06F 12/0246 711/103 |
| 9,128,848 B2* | 9/2015 | Zachariassen | ...... | G06F 12/0815 |
| 9,134,914 B1* | 9/2015 | Derbeko | ............ | G06F 17/30109 |
| 9,164,949 B1* | 10/2015 | Clark | ............... | G06F 15/167 |

(Continued)

FOREIGN PATENT DOCUMENTS

CN 103475718 A * 9/2013

OTHER PUBLICATIONS

English-language abstract of CN 103475718 A; retrieved from http://search.proquest.com/professional/patents/docview/1474021064/14FED3652AA1533CA14/1?accountid=161361 on Oct. 19, 2015 (4 pages).*

(Continued)

*Primary Examiner* — Daniel C Chappell
(74) *Attorney, Agent, or Firm* — Krishnendu Gupta; Konrad R. Lee

(57) ABSTRACT

A computer-executable method, system, and computer program product for managing a data storage system using a distributed write-through cache, wherein the data storage system comprises a first node, a second node, and a data storage array, wherein the first node includes a first cache and the second node includes a second cache, the computer-executable method, system, and computer program product comprising providing cache coherency on the data storage system by synchronizing the second cache with the first cache based on I/O requests received at the first node.

20 Claims, 9 Drawing Sheets

(56) References Cited

U.S. PATENT DOCUMENTS

| | | | |
|---|---|---|---|
| 9,256,534 B2* | 2/2016 | Li | G06F 12/0808 |
| 9,367,459 B2* | 6/2016 | Yamashita | G06F 9/5016 |
| 2003/0028819 A1* | 2/2003 | Chiu | G06F 11/2089 714/5.11 |
| 2004/0044850 A1* | 3/2004 | George | G06F 12/0835 711/131 |
| 2005/0108191 A1* | 5/2005 | Iyengar | G06F 17/30902 |
| 2013/0282656 A1* | 10/2013 | O'Neill | G06F 17/30212 707/622 |

OTHER PUBLICATIONS

Definition write through; Rouse et al; Jul. 2012; retrieved from http://whatis.techtarget.com/definition/write-through on Oct. 19, 2015 (1 page).*

FCache: a system for cache coherent processing on FPGAs; Mirian et al; Proceedings of the ACM/SIGDA international symposium on Field Programmable Gate Arrays; Feb. 22-24, 2012; pp. 233-236 (4 pages).*

Two adaptive hybrid cache coherency protocols; Anderson et al; Second International Symposium on High-Performance Computer Architecture; Feb. 3-7, 1996; pp. 303-313 (11 pages).*

A low-latency scalable locking algorithm for shared memory multiprocessors; Dave et al; Sixth IEEE Symposium on Parallel and Distributed Processing; Oct 26-29, 1994; pp. 10-17 (8 pages).*

A general model of concurrency and its implementation as many-core dynamic RISC processors; Bernard et al; International Conference on Embedded Computer Systems: Architectures, Modeling, and Simulation; Jul. 21-24, 2008; pp. 1-9 (9 pages).*

* cited by examiner

CACHE CONSISTENCY

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data storage.

BACKGROUND

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems and the like are very concerned with providing customers with an efficient data storage solution that minimizes cost while meeting customer data storage needs. It would be beneficial for such companies to have a way for reducing the complexity of implementing data storage.

SUMMARY

A computer-executable method, system, and computer program product for managing a data storage system using a distributed write-through cache, wherein the data storage system comprises a first node, a second node, and a data storage array, wherein the first node includes a first cache and the second node includes a second cache, the computer-executable method, system, and computer program product comprising providing cache coherency on the data storage system by synchronizing the second cache with the first cache based on I/O requests received at the first node.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

Like reference symbols in the various drawings indicate like elements.

DETAILED DESCRIPTION

Figure 1:
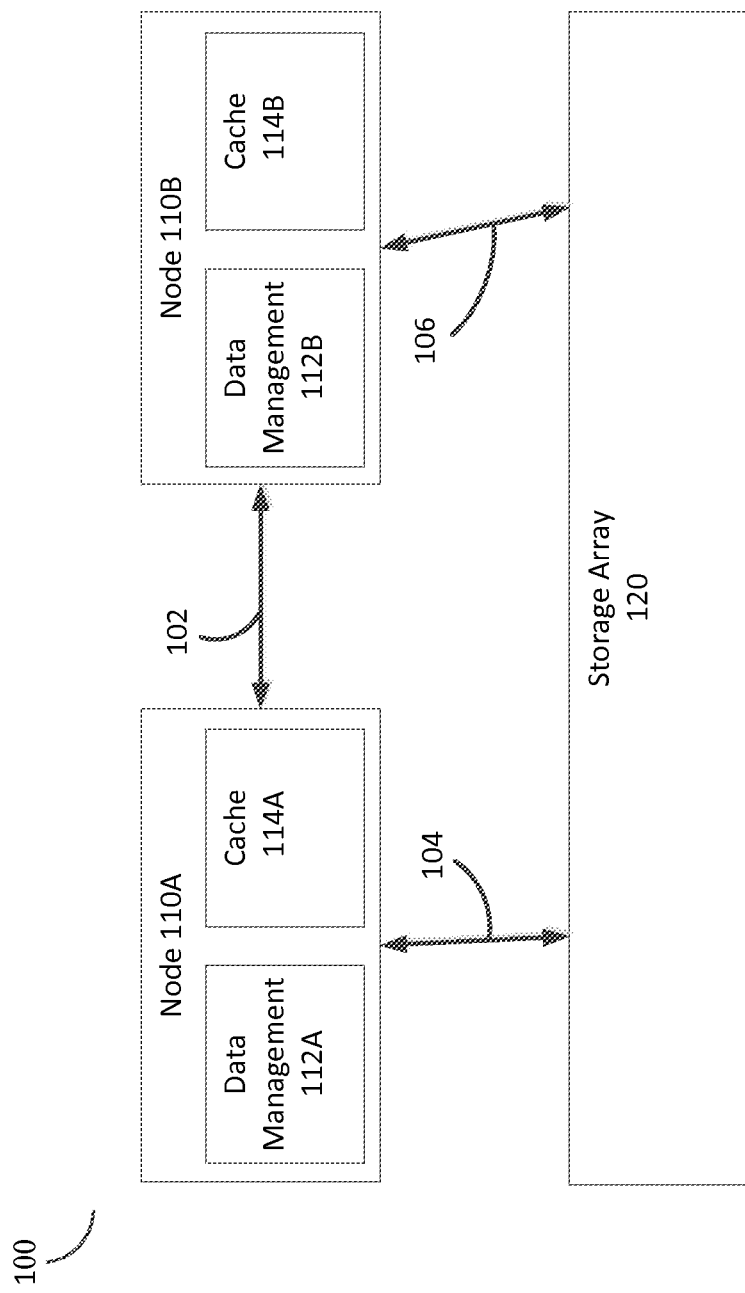
FIG. 1 is a simplified illustration of a data storage system including a distributed cache, in accordance with an embodiment of the present disclosure.

Traditionally, data storage systems employ distributed cache in active-active cluster implementations. Generally, a distributed cache requires synchronization of content across member nodes of an active-active cluster implementation. Conventionally, a common solution for synchronizing distributed cache is using clock synchronization between member nodes of an active-active cluster implementation. Typically, clock synchronization enables time-stamping for correct ordering of data written to distributed cache. Generally, clock synchronization enables a data storage system to stop caching on member nodes as it does not endanger the data, however, the clock synchronization degrades performance of the data storage system. Typically, clock synchronization increases the complexity of a data storage system. Conventionally, enabling a data storage system to maintain a consistent distributed cache without clock synchronization would be beneficial to the performance of the data storage system. In many embodiments, the current disclosure may enable creation of a data storage system employing a distributed cache. In various embodiments, the current disclosure may enable a distributed cache to be utilized without requiring clock synchronization. In certain embodiments, the current disclosure may enable synchronization of distributed cache without using clock synchronization. In other embodiments, the current disclosure may enable a data storage system to maintain a consistent distributed cache. In most embodiments, the current disclosure may enable use of a distributed cache while managing received I/O requests from one or more applications using a data storage system.

In many embodiments, a data storage system may include one or more nodes and one or more data storage arrays. In various embodiments, the one or more nodes may include cache which may be distributed among the one or more nodes in the data storage system. In most embodiments, cache may include flash and/or other non volatile data storage medium. In certain embodiments, each node may include a data management module managing their respective cache. In most embodiments, a distributed cache may operate in write-through mode. In various embodiments, write through mode may mean that reads from a data storage system may be acknowledged and/or processed from cache. In certain embodiments, write through mode may mean that writes may hit the underlying data storage array. In other embodiments, a data management module, executing on a node, may send heart-beat message to one or more nodes within a data storage system. In most embodiments, a data management module may send heart beat messages to each node within a data storage system. In various embodiments, a data management module may send cache I/O updates to one or more nodes in a data storage system. In certain embodiments, cache I/O updates may be used in place of a heart-beat message. In other embodiments, a cache I/O update may enable one or more nodes within a data storage system to maintain a consistent distributed cache throughout the data storage system.

In many embodiments, a data management module may periodically send heart beat and/or cache I/O updates to one or more nodes in a data storage system. In various embodiments, cache I/O updates may be sent in response to receiving and/or processing a received I/O request. In most embodiments, a node receiving a cache I/O update and/or heart beat message may acknowledge the received message. In various embodiments, a cache I/O update may be a write request notification. In some embodiments, a node that has received a cache I/O update, may send notification to all other nodes and may wait for responses from each of the nodes.

In certain embodiments, if a node does not receive a heart beat or cache I/O update notification/acknowledgement from one or more nodes, the node may take remedial action. In most embodiments, remedial action may include entering into a suspended mode. In certain embodiments, remedial action may include stopping caching in one or more nodes in a data storage system. In various embodiments, while caching is stopped, one or more nodes in a data storage system may execute in a pass through mode. In many embodiments, one or more nodes operating in a pass through mode may enable the one or more nodes to read and/or write data to the data storage system without using cache. In various embodiments, one or more nodes operating in a pass through mode may directly read and/or write data to a data storage array within the data storage system.

In most embodiments, a response to a cache I/O update and/or heart-beat message that takes longer than an interval T may signify a node failure from the instant node and/or from failed communication. In various embodiments, an administrator may specify T based on network configuration. In certain embodiments, if a response to a cache I/O update and/or heart-beat message does not arrive within a specified interval (T), then the data storage system may take remedial action.

In other embodiments, during a failed response, a node may wait for three time intervals (3T) and may not reply to cache I/O Update and/or heart-beat messages during the three time intervals. In various embodiments, an administrator and/or user may modify the failure response to wait for one or more time intervals to determine whether a failure has occurred. In some embodiments, once the three time intervals have passed, all nodes may be in a suspended mode. In certain embodiments, a suspended mode may include not caching in the data storage system. In most embodiments, caching may be restored after reconnecting the network connection and/or the one or more failed nodes are excluded from the data storage system.

Refer to the example embodiment of FIG. 1. FIG. 1 is a simplified illustration of a data storage system including a distributed cache, in accordance with an embodiment of the present disclosure. As shown, data storage system 100 includes node 110A, node 110B, and data storage array 120. Node 110A includes data management module 112A and cache 114A. Node 110B includes data management module 112B and cache 114B. Node 110A is in communication with node 110B and data storage array 120, as shown by arrow 102 and arrow 104 respectively. Node 110B is in communication with node 110A, as shown by arrow 102, and in communication with data storage array 120, as shown by arrow 106.

Figure 2:
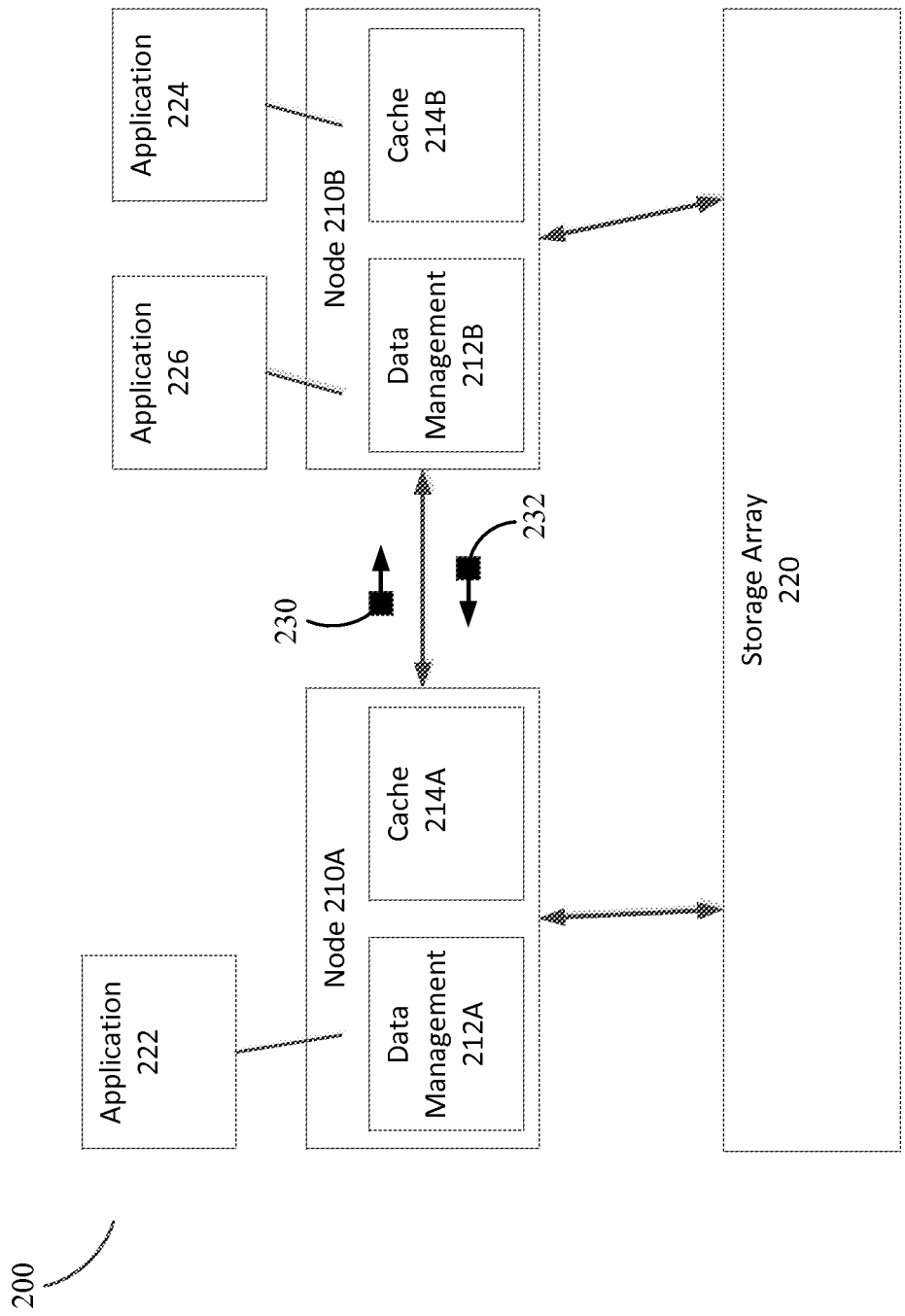
FIG. 2 is a simplified illustration of a data storage system using a distributed cache, in accordance with an embodiment of the present disclosure.

Refer to the example embodiment of FIG. 2. FIG. 2 is a simplified illustration of a data storage system using a distributed cache, in accordance with an embodiment of the present disclosure. As shown, data storage system 200 includes node 210A, node 210B, and data storage array 220. Node 210A includes data management module 212A and cache 214A. Node 210B includes data management module 212B and cache 214B. In this embodiment, application 222 is executing on node 210A and applications 226,224 are being executed on node 210B. As shown, data management module 212A is sending heart-beat message 230 to node 210B. data management module 212B receives heart-beat message 230 and responds with acknowledgement message 232.

Figure 3:
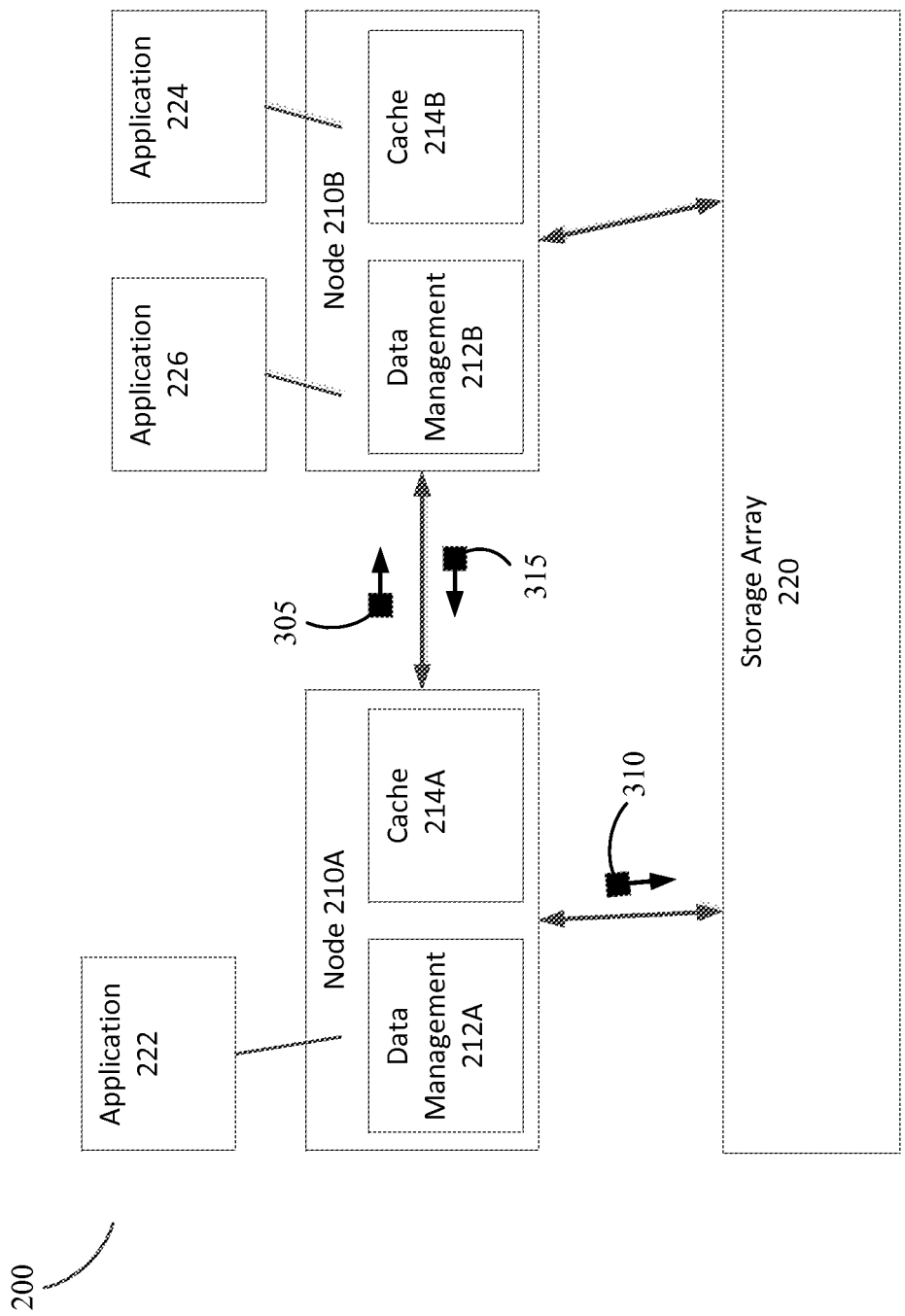
FIG. 3 is a simplified illustration of an application writing a data I/O to a data storage system, in accordance with an embodiment of the present disclosure.

Refer to the example embodiment of FIG. 3. FIG. 3 is a simplified illustration of an application writing a data I/O to a data storage system, in accordance with an embodiment of the present disclosure. In this embodiment, Application 222 executing on node 210A makes a data I/O write request to data management module 212A. Data management module 212A processes the data I/O write request and writes the data I/O request to cache 214A. Data management module 212A sends a cache I/O update in message 305 to data management module 212B. Data management module 212B processes message 305 and determines whether or not data stored on cache 214B should be marked stale. In many embodiments, stale data in cache on a node may be updated from a data storage array when an I/O request for the stale data is received by the node. Data management 212B responds to message 305 by sending acknowledgement message 315. Data management 212A is using write-through caching to write I/O requests to data storage array. As shown, data management 212A is writing I/O already written to cache 214A to data storage array 220 using message 310.

Figure 4:
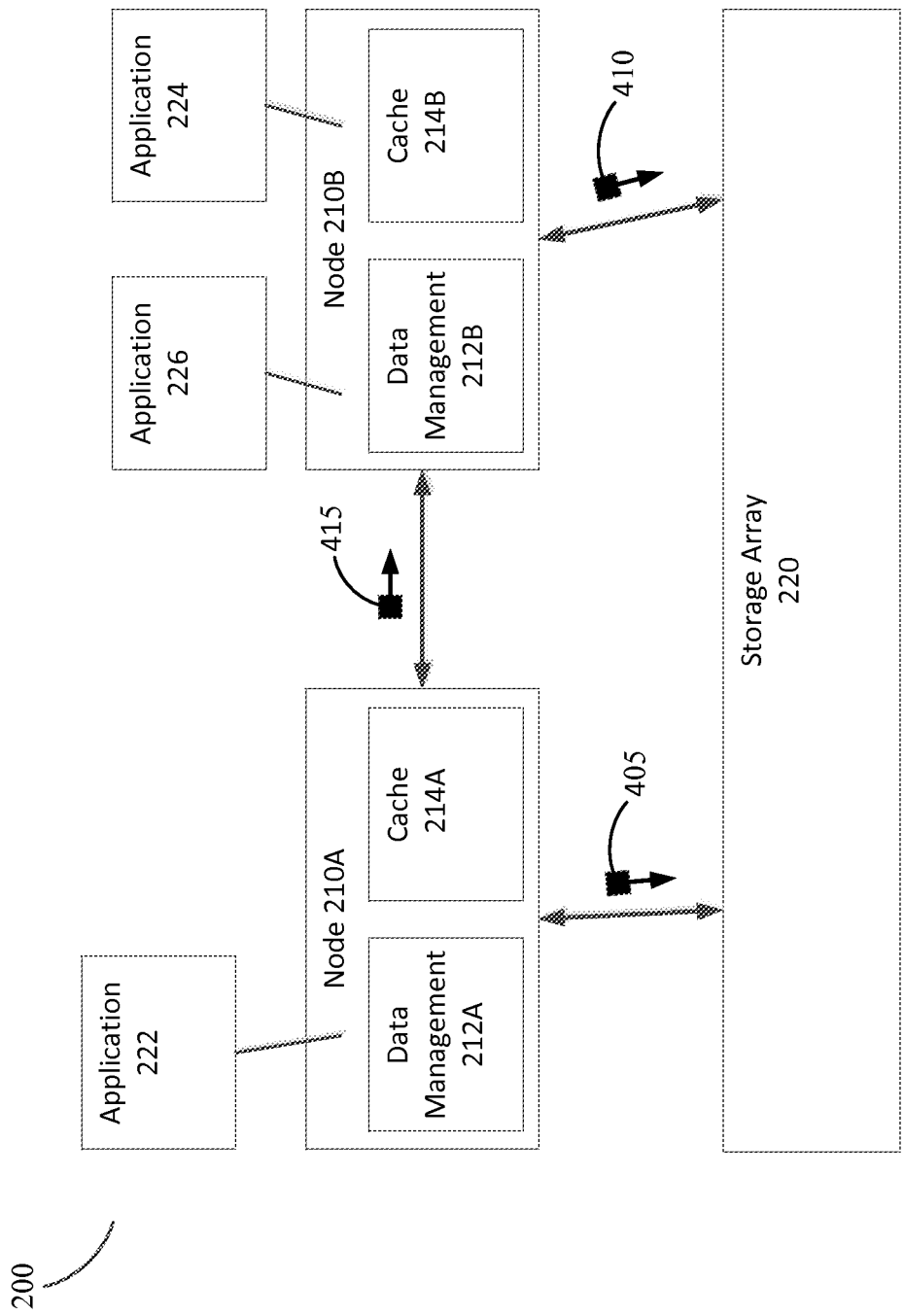
FIG. 4 is a simplified illustration of a failure in a data storage system using a distributed cache, in accordance with an embodiment of the present disclosure.

Refer to the example embodiment of FIG. 4. FIG. 4 is a simplified illustration of a failure in a data storage system using a distributed cache, in accordance with an embodiment of the present disclosure. As shown, data management 212A is sending message 415 to data management module 212B operating on node 210B. Data management 212A is awaiting an acknowledgment message from data management 212B in response to message 415. Upon waiting for a specified time interval, node 210A suspends all caching operations and switches to a pass through mode where no caching occurs. Data management module 212A writes received data I/Os to data storage array 220 using message 405. Node 210B is enabled to be alerted to node 210A being in suspended mode when node 210B does not receive any further messages from node 210A for at least 1 time interval. As shown, node 210B suspends write through caching operations and switches to a pass through mode. Data management module 212B writes received data I/Os to data storage array 220 using message 410. After three time intervals have passed, communication is enabled to be re-initiated between node 210A and node 210B and write-back caching is enabled to be re-initiated in data storage system 200.

Figure 5:
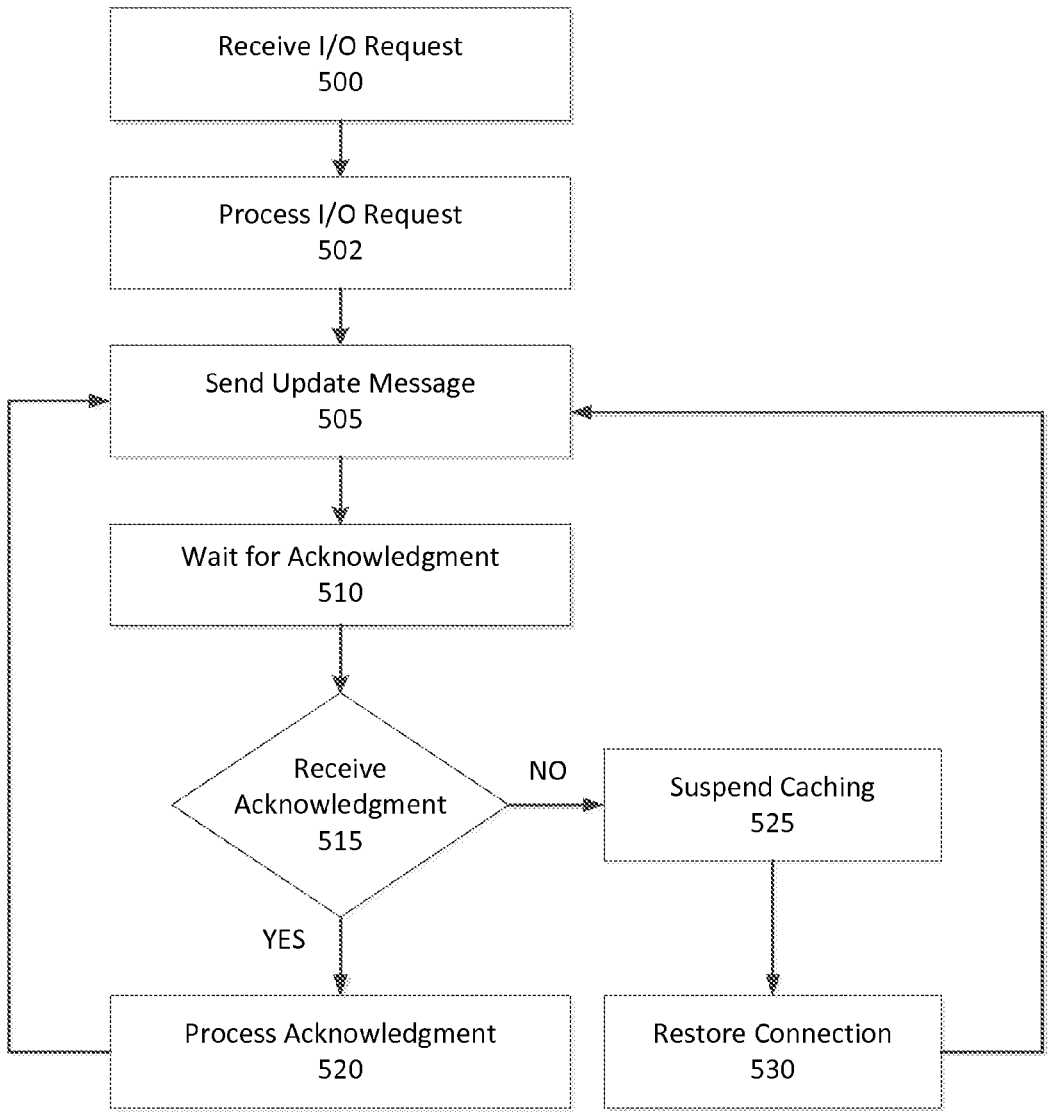
FIG. 5 is a simplified flowchart of a method of managing a distributed cache in the data storage system shown in FIG. 3, in accordance with an embodiment of the present disclosure.

Refer to the example embodiments of FIGS. 3 and 5. FIG. 5 is a simplified flowchart of a method of managing a distributed cache in the data storage system shown in FIG. 3, in accordance with an embodiment of the present disclosure. As shown in FIG. 3, node 210 receives I/O request (Step 500) from application 222. Data management module 212A processes I/O request (Step 502) and updates cache 214A based on I/O request. Data management module 212A sends message 310 updating data storage array 220 with data from received I/O request. Data management module sends an update message (Step 505), using message 305, to data management module 212B. Data management module 212A waits for an acknowledgement message (Step 510) from data management module 212B on node 210B. In this embodiment, data management 212A receives acknowledgement from data management 212B in message 315 (Step 515) and processes acknowledgment (Step 520). Data management 212A continues the above-mentioned process to determine whether a failure has occurred in data storage system 200. If node 210A does not receive an acknowledgement message from node 210B, data management 212A suspends caching (Step 525) for a specified time interval and then attempts to restore the connection (Step 530) between node 210A and node 210B. While node 210A is suspended, node 210A is enabled to operate using write-through caching to store received I/Os on data storage array 220.

Figure 6:
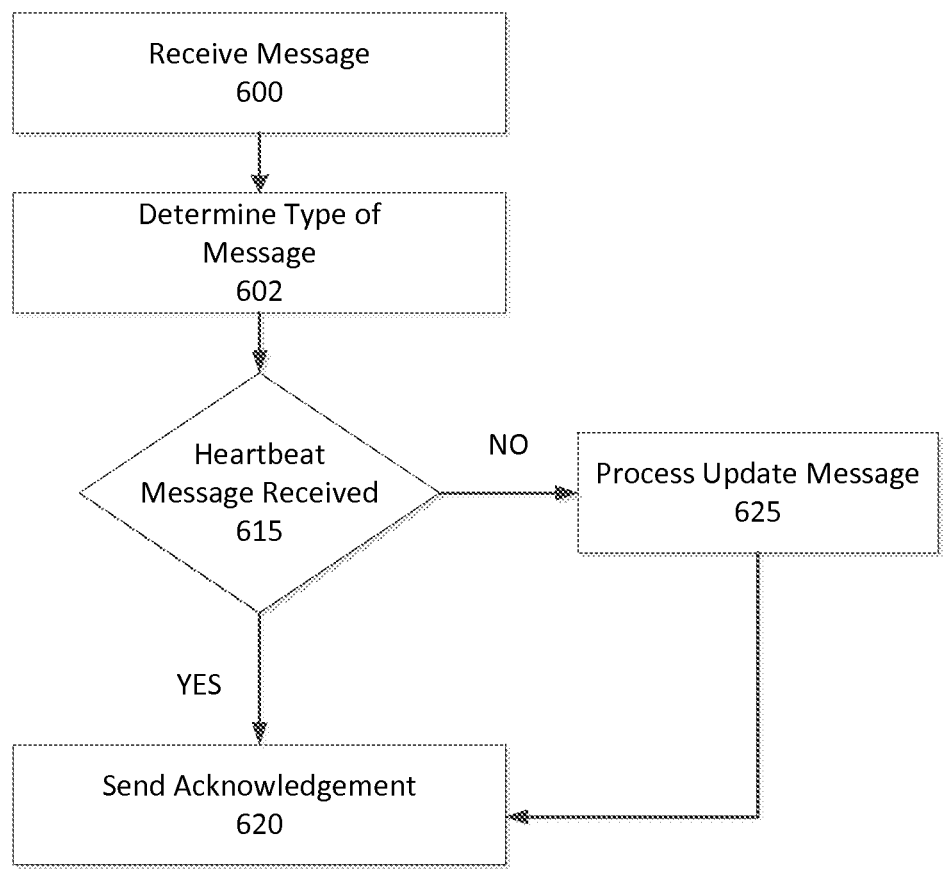
FIG. 6 is an alternate simplified flowchart of a method of managing a distributed cache in the data storage system shown in FIG. 3, in accordance with an embodiment of the present disclosure.

Refer to the example embodiments of FIGS. 3 and 6. FIG. 6 is an alternate simplified flowchart of a method of managing a distributed cache in the data storage system shown in FIG. 3, in accordance with an embodiment of the present disclosure. As shown, node 210B receives message 305 from node 210A (Step 600). Data management module 212B determines which type of message was received (Step 602). Upon the determination that a heart best message was received (Step 615), data management module 212B sends an acknowledgment to the heart-beat message in message 315 (Step 620). Alternatively, if the data management module 212B determines that message 305 is a cache I/O update message, data management module 212B processes the cache I/O update message (Step 625). Data management module 212B updates cache 214B based on the received cache I/O update message. Data management module 212B responds to the received cache I/O update message by sending an acknowledgment message (Step 620) to node 210A.

Figure 7:
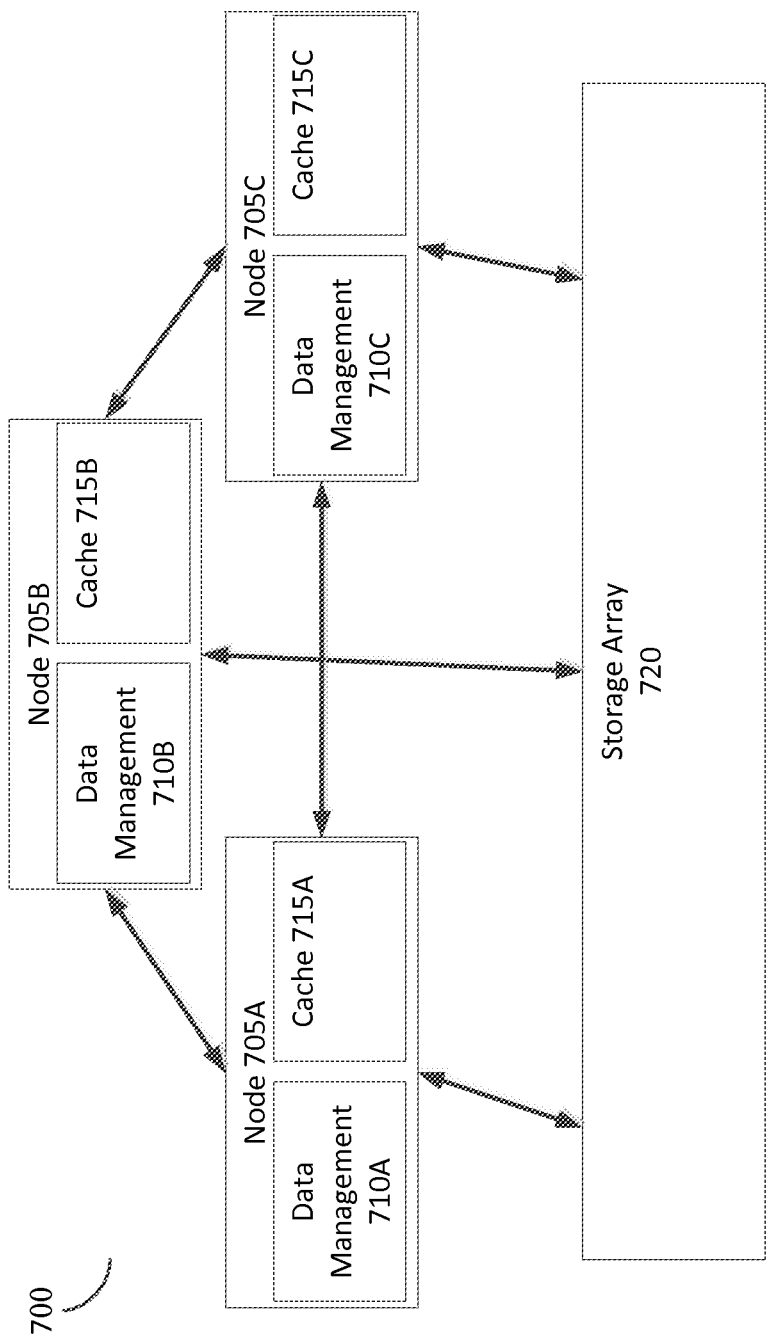
FIG. 7 is a simplified illustration of a data storage system including multiple nodes, in accordance with an embodiment of the present disclosure.

Refer to the example embodiment of FIG. 7. FIG. 7 is a simplified illustration of a data storage system including multiple nodes, in accordance with an embodiment of the present disclosure. As shown, data storage system 700 includes nodes (705A-C, 705 Generally) and Data storage array 720. Node 705A is in communication with Node 705B, node 705C and Data storage array 720. Node 705B is in communication with Node 705A, Node 705C, and data storage array 720. Node 705C is in communication with Node 705A, Node 705B, and data storage array 720. In this embodiment, data storage system 700 is enabled to operate a distributed cache using nodes 705A, 705B, 705C. In many embodiments, a data storage system may include one or more data storage arrays and may be in communication with one or more nodes which may be enabled to implement a distributed cache.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium.

Figure 8:
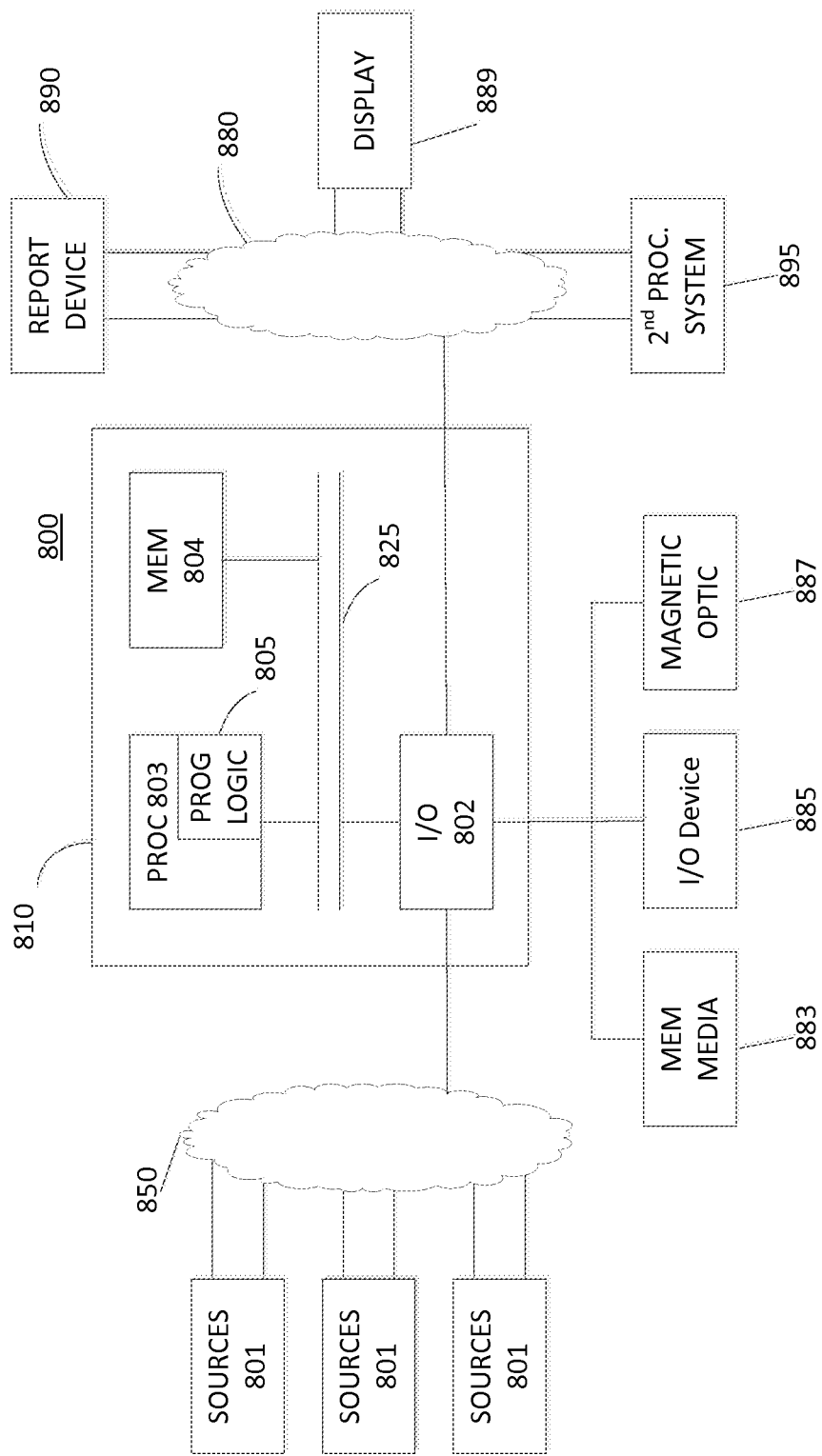
FIG. 8 is an example of an embodiment of an apparatus that may utilize the techniques described herein, in accordance with an embodiment of the present disclosure.

FIG. 8 is a block diagram illustrating an apparatus, such as a computer 810 in a network 800, which may utilize the techniques described herein according to an example embodiment of the present invention. The computer 810 may include one or more I/O ports 802, a processor 803, and memory 804, all of which may be connected by an interconnect 825, such as a bus. Processor 803 may include program logic 805. The I/O port 802 may provide connectivity to memory media 883, I/O devices 885, and drives 887, such as magnetic or optical drives. When the program code is loaded into memory 804 and executed by the computer 810, the machine becomes an apparatus for practicing the invention. When implemented on one or more general-purpose processors 803, the program code combines with such a processor to provide a unique apparatus that operates analogously to specific logic circuits. As such, a general purpose digital machine can be transformed into a special purpose digital machine.

Figure 9:
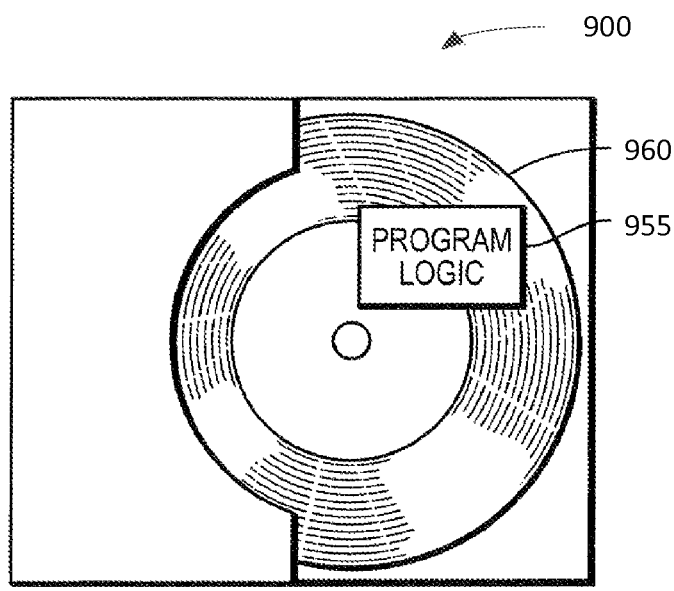
FIG. 9 is an example of a method embodied on a computer readable storage medium that may utilize the techniques described herein, in accordance with an embodiment of the present disclosure.

FIG. 9 is a block diagram illustrating a method embodied on a computer readable storage medium 960 that may utilize the techniques described herein according to an example embodiment of the present invention. FIG. 9 shows Program Logic 955 embodied on a computer-readable medium 960 as shown, and wherein the Logic is encoded in computer-executable code configured for carrying out the methods of this invention and thereby forming a Computer Program Product 900. Program Logic 955 may be the same logic 805 on memory 804 loaded on processor 803 in FIG. 8. The program logic may be embodied in software modules, as modules, as hardware modules, or on virtual machines.

The logic for carrying out the method may be embodied as part of the aforementioned system, which is useful for carrying out a method described with reference to embodiments shown in, for example, FIGS. 1-9. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A computer-executable method of managing a data storage system using a distributed write-through cache, wherein the data storage system comprises a first node, a second node, and a data storage array, wherein the first node includes a first cache and the second node includes a second cache, the computer-executable method comprising:

providing cache coherency on the data storage, system by synchronizing the second cache with the first cache based on Input/Output (I/O) requests received at the first node;

wherein nodes within the data storage system are enabled to reinitialize communication between the nodes upon determining that communication between nodes within the data storage system has failed;

wherein nodes within the data storage system are enabled to suspend cache synchronization upon a specified number of failed attempts to reinitialize communication between the nodes;

upon suspension of any node within the data storage system, the data storage system is enabled to notify every other node within the data storage system of the suspension; and upon reinitialization of communication with any suspended node within the data storage system, restoring cache coherency on the data storage system by synchronizing a cache of the any suspended node with any cache of any functional node of the data storage system.

2. The computer-executable method of claim 1, wherein the synchronizing comprises:

processing an I/O request received at the first node, wherein the I/O request relates to data stored on the data storage array; and sending an update message to the second node.

3. The computer-executable method of claim 2, wherein the update message is a heartbeat message.

4. The computer-executable method of claim 2, wherein the update message relates to stale data stored within the second cache on the second node.

5. The computer-executable method of claim 2, further comprising:

checking, at the first node, for an acknowledgment of the update message;

wherein the first node continues checking for a first amount of time, wherein when the first amount of time elapses, the first node suspends caching on the first node and is enabled to operate in a pass through mode.

6. The computer-executable method of claim 5, further comprising:

re-initializing communication between the first node and the second node once a second amount of time has elapsed.

7. The computer-executable method of claim 2, further comprising:

receiving the update message at the second node;

making a determination, at the second node, whether the update message is a heartbeat message; and upon making a positive determination that the update message is a heartbeat message, sending an acknowledgement message from the second node in response to the update message.

8. The computer-executable method of claim 7, further comprising upon making a negative determination that the update message is a heartbeat message, updating a status of the second cache based on the update message.

9. A system, comprising:

a data storage system including a first node, a second node, and a data storage array, wherein the first node includes a first cache and the second node includes a second cache; and computer-executable program logic encoded in memory of one or more computers in communication with the data storage system to enable management of a distributed write-through cache, wherein the computer-executable program logic is configured for the execution of:

providing cache coherency on the data storage system by synchronizing the second cache with the first cache based on Input/Output (I/O) requests received at the first node;

wherein nodes within the data storage system are enabled to reinitialize communication between the nodes upon determining that communication between nodes within the data storage system has failed;

wherein nodes within the data storage system are enabled to suspend cache synchronization upon a specified number of failed attempts to reinitialize communication between the nodes;

upon suspension of any node within the data storage system, the data storage system is enabled to notify every other node within the data storage system of the suspension; and upon reinitialization of communication with any suspended node within the data storage system, restoring cache coherency on the data storage system by synchronizing a cache of the any suspended node with any cache of any functional node of the data storage system.

10. The system of claim 9, wherein the synchronizing comprises:

processing an I/O request received at the first node, wherein the I/O request relates to data stored on the data storage array; and sending an update message to the second node.

11. The system of claim 10, wherein the update message is a heartbeat message.

12. The system of claim 10, wherein the update message relates to stale data stored within the second cache on the second node.

13. The system of claim 10, wherein the computer-executable program logic is further configured for the execution of:

checking, at the first node, for an acknowledgment of the update message;

wherein the first node continues checking for a first amount of time, wherein when the first amount of time elapses, the first node suspends caching on the first node and is enabled to operate in a pass through mode.

14. The system of claim 13, wherein the computer-executable program logic is further configured for the execution of:

re-initializing communication between the first node and the second node once a second amount of time has elapsed.

15. The system of claim 10, wherein the computer-executable program logic is further configured for the execution of:

receiving the update message at the second node;

making, a determination, at the second node, whether the update message is a heartbeat message; and upon making a positive determination that the update message is a heartbeat message, sending an acknowledgement message from the second node in response to the update message.

16. The system of claim 15, wherein the computer-executable program logic is further configured for the execution of upon making a negative determination that the update message is a heartbeat message, updating a status of the second cache based on the update message.

17. A computer program product for managing a data storage system using a distributed write-through cache, wherein the data storage system comprises a first node, a second, node, and a data storage array, wherein the first node includes a first cache and the second node includes a second cache, the computer program product comprising:
    a non-transitory computer readable medium encoded with computer-executable program code for using read signatures in replication, the code configured to enable the execution of:
        providing cache coherency on the data storage system by synchronizing, the second cache with the first cache based on Input/Output (I/O) requests received at the first node;
        wherein nodes within the data storage system are enabled to reinitialize communication between the nodes upon determining that communication between nodes within the data storage system has failed;
        wherein nodes within the data storage system are enabled to suspend cache synchronization upon a specified number of failed attempts to reinitialize communication between the nodes;
        upon suspension of any node within the data storage system, the data storage system is enabled to notify every other node within the data storage system of the suspension; and
        upon reinitialization of communication with any suspended node within the data storage system, restoring cache coherency on the data storage system by synchronizing a cache of the any suspended node with any cache of any functional node of the data storage system.

18. The computer program product of claim 17, wherein the synchronizing comprises:
    processing an I/O request received at the first node, wherein the I/O request relates to data stored on the data storage array; and
    sending an update message to the second node.

19. The computer program product of claim 18, wherein the code is further configured to enable the execution of:
    checking, at the first node, for an acknowledgment of the update message;
    wherein the first node continues checking for a first amount of time, wherein when the first amount of time elapses, the first node suspends caching on the first node and is enabled to operate in a pass through mode.

20. The computer program product of claim 19, wherein the code is further configured to enable the execution of:
    re-initializing communication between the first node and the second node once a second amount of time has elapsed.

\* \* \* \* \*